United States Patent [19]
Robertson et al.

[11] Patent Number: 5,272,809
[45] Date of Patent: Dec. 28, 1993

[54] TECHNIQUE FOR DIRECT BONDING CAST AND WROUGHT MATERIALS

[75] Inventors: John M. Robertson, Tequesta; Robert W. Baumgarten, Palm Beach Gardens; Ralph B. Bogard, North Palm Beach; Brian T. Dunn, Jupiter, all of Fla.

[73] Assignee: United Technologies Corporation, Hartford, Conn.

[21] Appl. No.: 955,637

[22] Filed: Oct. 2, 1992

Related U.S. Application Data

[63] Continuation-in-part of Ser. No. 577,231, Sep. 4, 1990, abandoned.

[51] Int. Cl.⁵ .............................................. B23K 31/02
[52] U.S. Cl. .............................. 29/889.1; 29/402.07; 29/402.13; 228/194
[58] Field of Search .......... 29/402.07, 402.08, 402.13, 29/838.021, 889.1, 889.2; 72/342; 148/11.5 F; 228/119, 194; 219/69.17; 415/217

[56] References Cited

U.S. PATENT DOCUMENTS

| | | | |
|---|---|---|---|
| 3,519,503 | 7/1970 | Moore et al. | 148/11.5 F |
| 3,632,319 | 4/1972 | Hoppin et al. | 228/194 |
| 3,700,427 | 10/1972 | Hoppin, III et al. | 228/194 X |
| 3,802,046 | 4/1974 | Wachtell et al. | 29/889.1 |
| 4,155,152 | 5/1979 | Cretella et al. | 29/889.1 |
| 4,214,355 | 7/1980 | Zelahy | 29/889.1 |
| 4,285,108 | 8/1981 | Arrigoni | 29/889.1 |
| 4,291,566 | 9/1981 | Dinsdale | 72/342 |
| 4,305,697 | 12/1981 | Cohen et al. | 415/217 |
| 4,326,833 | 4/1982 | Zelahy et al. | 29/889.1 X |
| 4,390,320 | 6/1983 | Eiswerth | 29/889.1 X |
| 4,676,843 | 6/1987 | Nazmy | 29/889.1 X |
| 4,873,751 | 10/1989 | Walker et al. | 29/402.13 X |
| 4,883,216 | 11/1989 | Patsfall | 228/119 |

Primary Examiner—Peter Dungba Vo
Attorney, Agent, or Firm—Herbert W. Mylius

[57] ABSTRACT

A method is taught for joining a wrought alloy material to a cast alloy, so as to obtain a joint having superior structural integrity. A cast nickel-base superalloy part may be bonded to a wrought nickel-base superalloy part, for example, by positioning a suitable part or blank of said wrought superalloy adjacent to the cast superalloy part, applying a local bonding force to the interface while locally heating the interface to a temperature which causes localized softening, metal flow, and bonding, removing said bonding force, and subjecting the bonded assembly to a local or isothermal heat treatment so as to minimize distortion, optimize properties, and stress relieve the bonded assembly. This method may be used, for example, for the repair or replacement of vane assembly retaining lugs, whereby a replacement lug of a wrought alloy is solid state bonded to the vane assembly in place of the previous retaining lug.

29 Claims, 7 Drawing Sheets

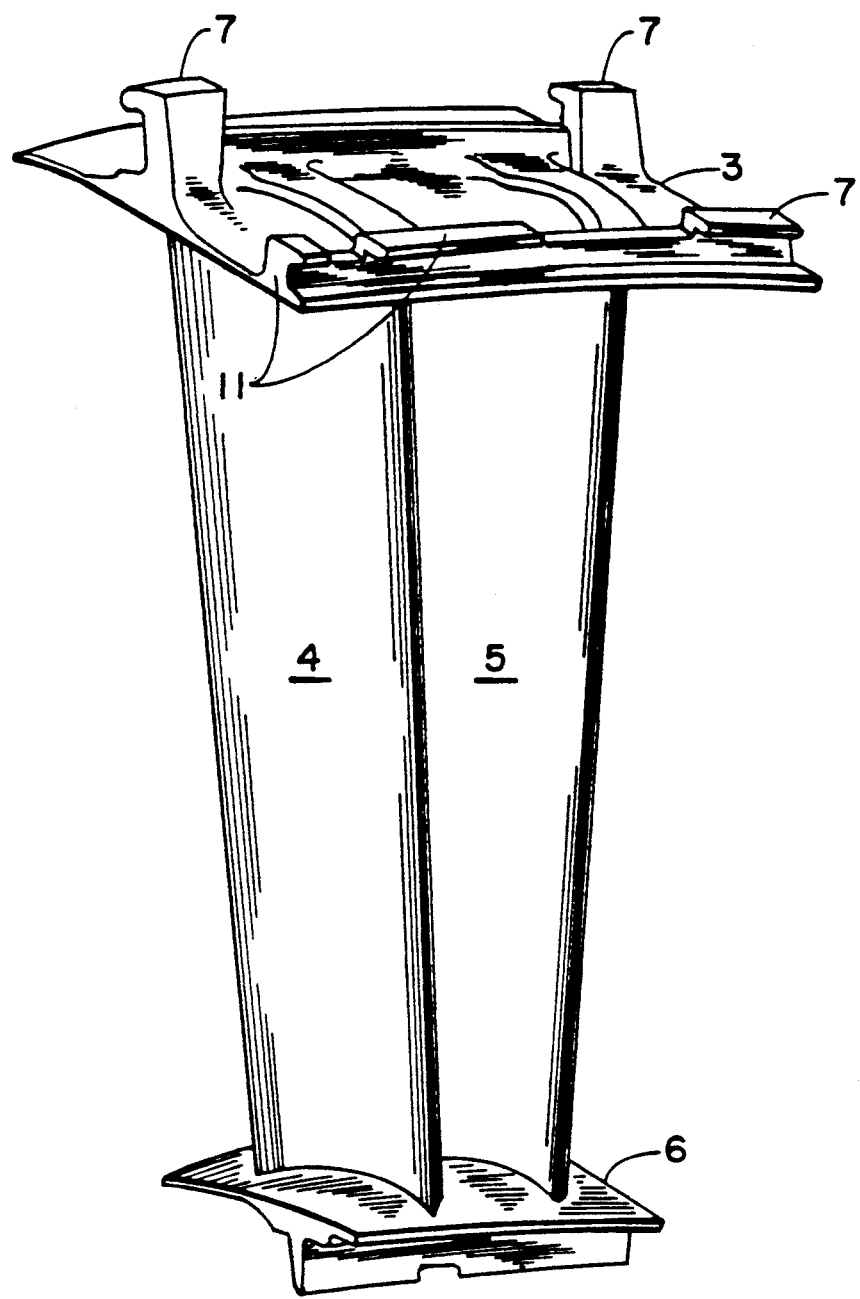
F I G. 5

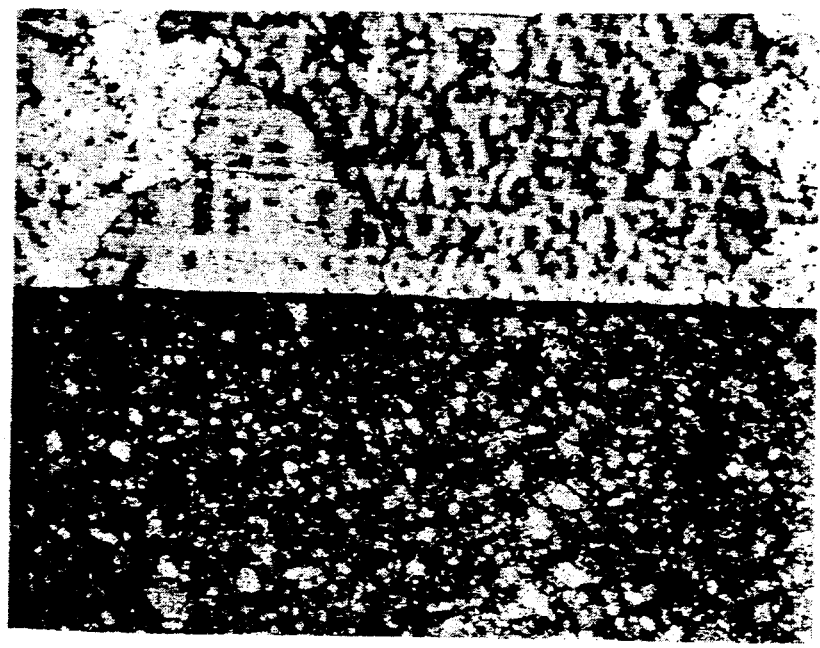
FIG. 6    50X
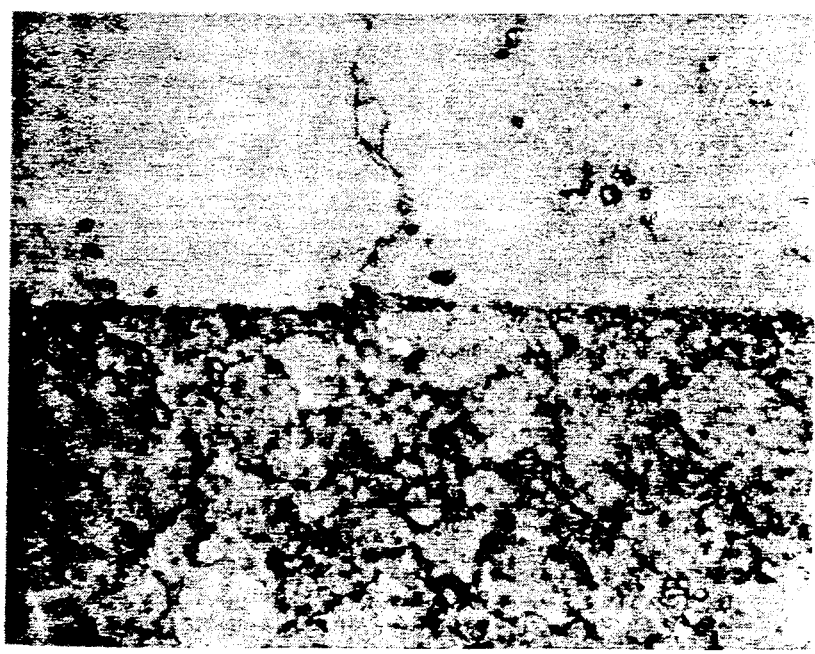
FIG. 7    500X

TECHNIQUE FOR DIRECT BONDING CAST AND WROUGHT MATERIALS

CROSS REFERENCE TO RELATED APPLICATION

This is a continuation-in-part of patent application Ser. No. 07/577,231, filed Sep. 4, 1990, entitled Vane Lug Repair Technique, in the names of Robertson et al, now abandoned.

TECHNICAL FIELD

This invention relates to a technique for bonding wrought materials to cast materials, with specific application to the construction or repair of jet engines, such as joining cast blades to wrought disks, wrought flanges to cast cases, or repair of retaining lugs on turbine engine vanes.

BACKGROUND

A gas turbine engine includes a compressor section, a combustion section, and a turbine section. Disposed within the turbine section are alternating rows of rotatable blades and static vanes. The stationary vanes, disposed between rows of rotating blades, stabilize and direct the gas flow from one row of rotating blades to the next row. Such gas flow stabilization optimizes the flow through the turbine section, thereby maximizing the amount of work extracted. As hot combustion gases pass through the turbine section, the blades are rotatably driven, turning a shaft which drives the compressor and other auxiliary systems. The higher the gas temperature, the more energy which can be extracted in the turbine section, and the greater the overall efficiency. In order to increase the turbine section operating temperature capability, nickel-base superalloy materials are commonly used to produce the turbine airfoil blades and vanes, since such materials retain mechanical properties at elevated temperatures.

The stator, or stationary vane, assembly normally mounts in the engine case. While rows of rotor blades extend outwardly from the rotor across the gas flow path, in both the turbine and compressor sections, an array of stator vanes extends inwardly from the engine case across the gas flow path at the downstream end of most blade rows. Such vanes are frequently held in place at the engine case by feet, or lugs, which are engaged by flanges or retaining rings extending inwardly from the outer case. Frequently such lugs are damaged, mis-machined during manufacture, or broken during installation or use. Vanes must operate close to their temperature limits, and if they should be subjected to even brief exposure to higher temperatures, the strength and fatigue capability of the material used may be decreased. Turbine vanes may also undergo distortion, stretching, and elongation during service. This condition, referred to as metal creep, may reduce service life, and in combination with reduced strength and fatigue capability, result in vane retaining lug failure. The present invention provides a method for the repair of such lugs, or for the reconfiguration thereof in the event of a design modification. The present invention further provides a method for the repair or reconfiguration of other parts or assemblies, where joining or addition of new material is necessary.

In the past, such repair or modification has been difficult due to the nature of the materials involved. Turbine blade and vane assemblies are frequently made from a cast single crystal material, for which welding is not a suitable repair technique due to microcracking or strain age cracking, and since local heat and working will cause a single crystal alloy to recrystallize, such a treatment would compromise the very properties for which the alloy was selected. The preferred material for repair of a cast part would logically be the same cast material, since the properties of the repair material would then be identical to those of the item to which the repair was made. Further, cast materials have critical superior properties, specifically creep resistance, which are important to the purpose and utilization of the parts fabricated therefrom. Unfortunately, this very property makes it impossible to utilize the parent material for a repair in which new material is joined to a cast material part, since the superior creep resistance actually inhibits the necessary material flow required to establish a quality bond. Attempts to build up a broken area by such techniques as plasma spraying additional material onto the broken area do not typically meet structural creep and fatigue property requirements at elevated temperatures.

Since many cast, hardenable nickel-base materials are not capable of welding, means were sought to achieve a solid state bond of a replacement blank to a cast assembly. It was found that cast replacement blanks could not effectively be forge joined to a cast assembly, due to high joining load requirements and the inability to achieve adequate deformation to avoid continuous interfacial carbide precipitation at the bond interface. Wrougt materials, on the other hand, are generally more suitable for forge joining, and a number of techniques are known for the bonding of wrought alloys. An exemplary development is the Gatorizing ® isothermal forging method useful with high temperature alloys, as described in commonly owned U.S. Pat. No. 3,519,503, of Moore et al, the teachings of which are incorporated herein by reference. In addition, commonly owned U.S. Pat. No. 4,873,751, of Walker et al, teaches a fabrication or repair technique for integral bladed rotors, wherein the rotor and blades were forged from the same material. In addition, U.S. Pat. No. 4,883,216, of Patsfall, also teaches a method for the repair of a damaged part by bonding a replacement part to the stub of the damaged projection. However, prior to the present invention, no technique was available for the successful joining of a cast superalloy to wrought superalloy, such as would be necessary in the repair of the retaining lugs or feet of stator vane assemblies, or the joining of parts of differing materials to form an assembly having unique properties and capabilities, such as bonding cast blades to a wrought disk.

SUMMARY OF THE INVENTION

In both the compressor and turbine sections of modern jet engines, components are operated at or near the outer limits of their capabilities with respect to both temperature and stress, and, accordingly, any repair or joining technique with respect to such components must provide results which retain the strength and temperature capabilities of said components. Other requirements of the component, such as fatigue resistance, resistance to rupture, and life span must also be met by the repaired or joined parts.

The need for repair may arise both in service and in the initial fabrication of the engine. Further, subsequent design change or modification may make it desirable to modify or replace a given component to achieve greater efficiencies, greater reliability, or longer life.

The present invention relates to a method for joining wrought superalloy components to cast components, such as exemplified by the repair or replacement of retaining lugs or feet on gas turbine engine vanes, where such vanes are comprised of cast nickel-base or cobalt-base superalloys or titanium alloys, and the replacement retaining lugs are of wrought material. According to the present invention a wrought material replacement lug blank, preferably but not necessarily of an alloy having a chemical composition similar to that of the vane material, is forge joined in place by locally heating the interface surfaces of the replacement wrought lug blank and the cast vane platform to a temperature within the solution temperature range of both alloys, and applying a load sufficient to produce deformation in the wrought material at the interfacial surface, thereby forming a solid state bond between the replacement lug blank and the vane. After joining, the bonded assembly may be heat treated, such as by local or isothermally vacuum solution heat treatment, and aged at temperatures compatible with the solution and aging temperatures of the two alloys. Thermal distortion of the vane is not a problem due to the inherently high thermal stability of the cast material of the vane. While the bonded replacement lug may distort, the lug is sized so as to be sufficiently oversized to accept such distortion. After heat treatment, the bonded lug may be machined to the final configuration required.

According to one aspect of the invention, a component assembly having a mis-machined part may be repaired by replacement of the incorrect part with a new piece of material, from which the new part may be machined properly. Thus, it is an object of the present invention to permit the replacement of improperly machined parts with correctly machined parts. It is a further object of the invention to permit the replacement of a damaged or broken part with a part of similar configuration or, if desired, with a part of differing dimension or configuration. It is a further object of the present invention to permit the replacement of component parts in the event of a design modification or improvement. Although this invention is described in the specific terms of repairing the feet or lugs of vanes of gas turbine engines, the invention is also applicable to repair of attachment means of other superalloy components of like nature, or for joining such components as cast blades to wrought disks, wrought tangs to cast blades, or wrought flanges to cast cases. Broadly, the present invention may be employed to fabricate components which require the properties of a cast material in one area and the properties of a wrought material in another area, while providing structural integrity in the joint area that is not available with other techniques due to material constraints.

These and other objects and advantages of the present invention will become more readily understood through reference to the following description of the drawings and preferred embodiments.

BRIEF DESCRIPTION OF THE DRAWINGS

FIG. 5 illustrates a vane assembly having a new retaining lug, of different size, bonded thereto.

FIGS. 6 and 7 are photomicrographs of a repaired vane microstructure at magnifications of 50× and 500×, with Kallings' etchant.

DETAILED DESCRIPTION OF THE INVENTION

The present invention provides a method for joining a wrought superalloy to a cast superalloy material. The invention is exemplified by the repair of broken, damaged or improperly machined parts of components for gas turbine engines, where such parts are made of high strength, high temperature materials such as nickel-base or cobalt-base superalloys, or titanium alloys, and also provides a method for the replacement of such parts when appropriate. Cast materials afford economic, performance and producibility advances over use of wrought materials, such as for turbine vane applications. Consequently, most turbine vanes are cast, commonly using the lost wax technique. As is well known, structural welds in many hardenable cast superalloys are not feasible, due to microcrack formation. Surprisingly, we have discovered that a wrought replacement part, such as a lug, may be joined to the cast vane assembly, by a forge joining technique. By use of a wrought replacement piece in a re-designed configuration, superior high temperature lug strength properties may be attained in the component, resulting in a vane assembly having adequate creep capability to meet design requirements, and superior high temperature strength in the lug per se.

Figure 1:
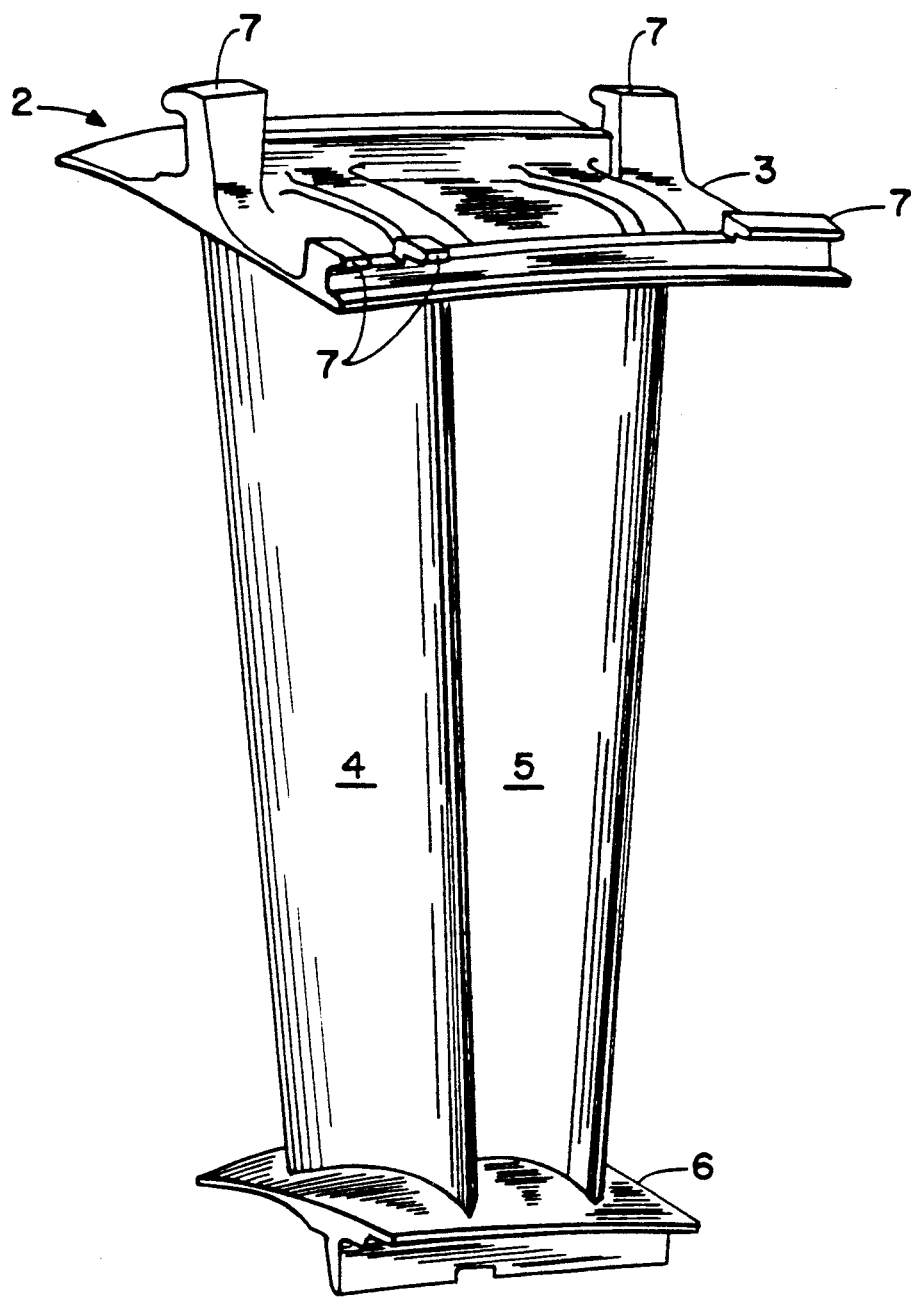
FIG. 1 illustrates a dual airfoil vane of the type for which the present invention is suitable.
Figure 2:
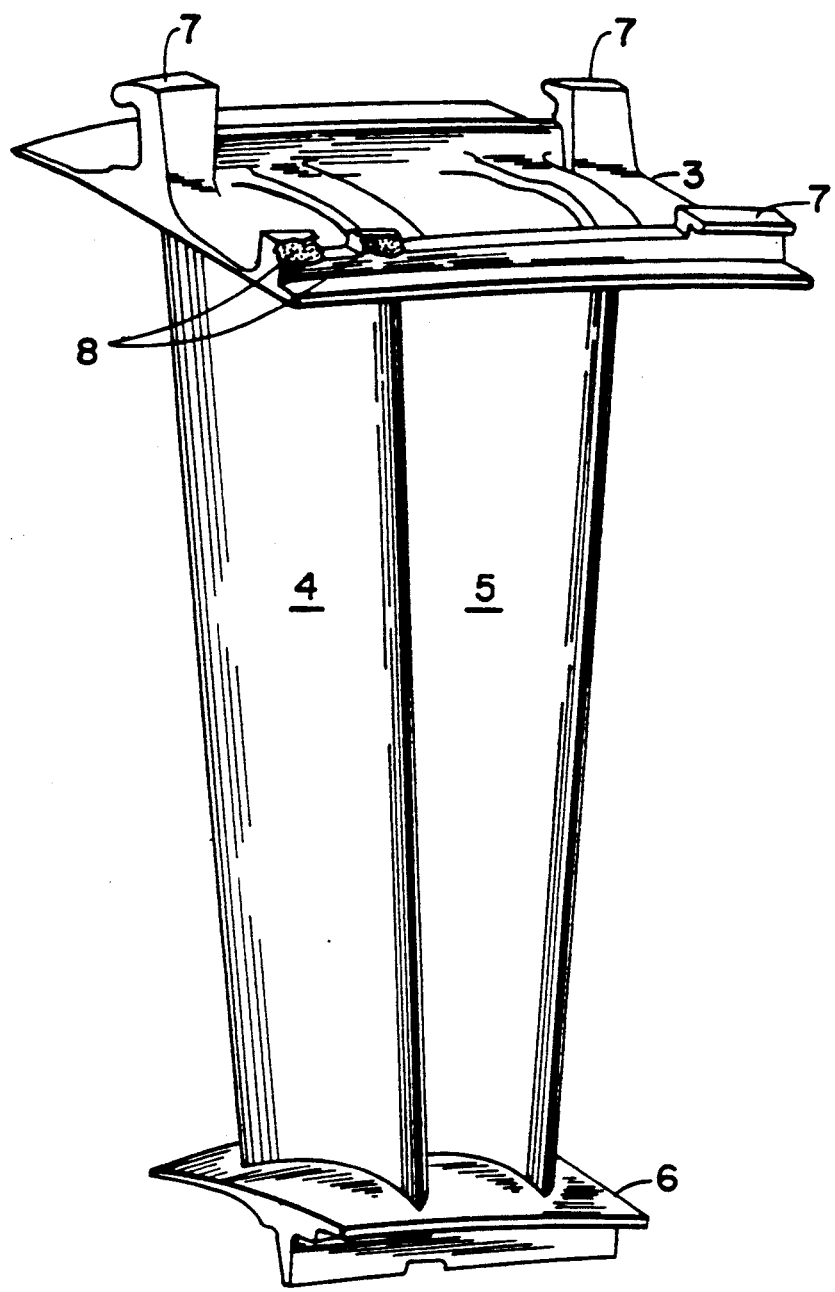
FIG. 2 illustrates a vane assembly demonstrating a broken retaining lug.
Figure 3:
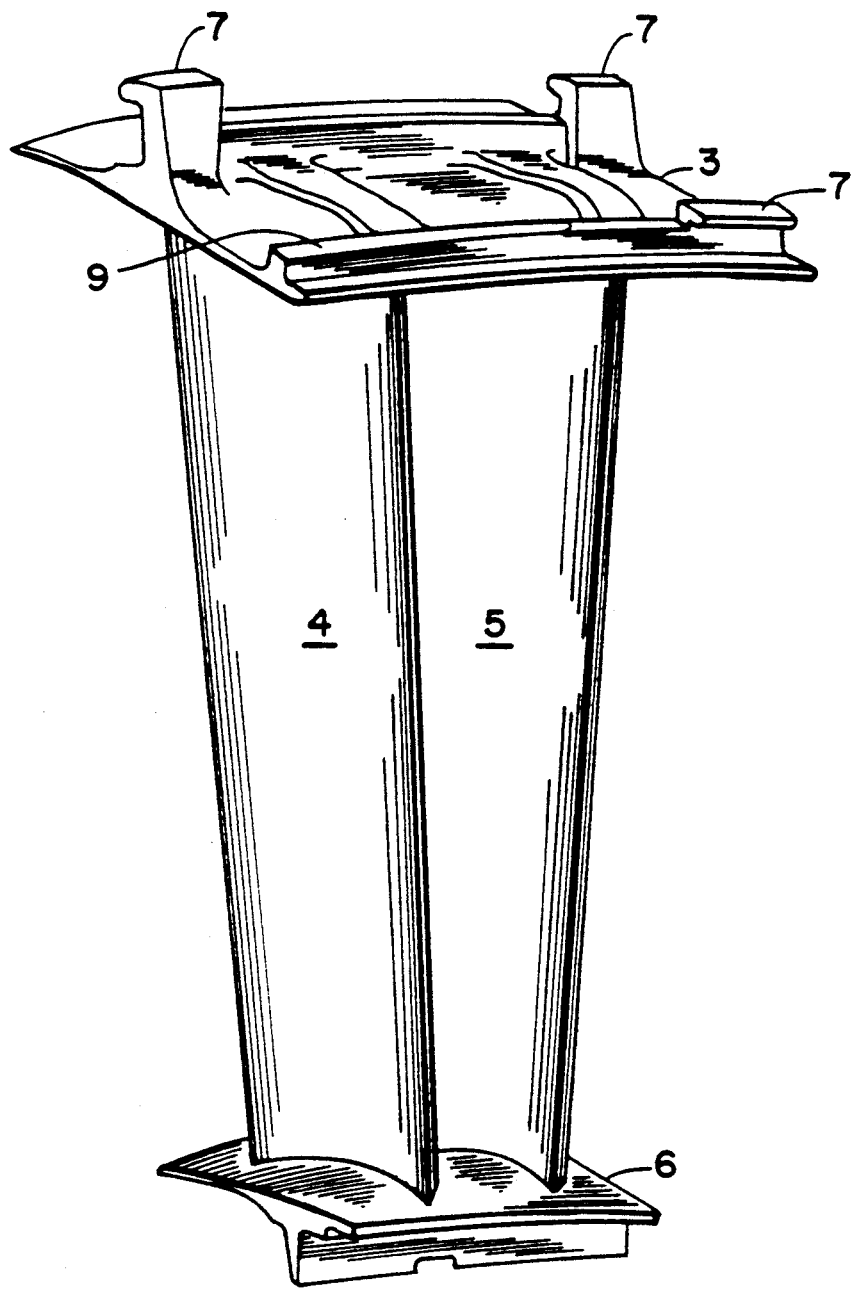
FIG. 3 illustrates a vane assembly from which a broken or damaged lug has been removed, as by machining.

In accordance with an exemplary use of this invention, a cast vane assembly, 2, such as shown in FIG. 1, comprises a vane outside diameter platform, 3, vanes 4 and 5, and an annulus inside diameter platform, 6. The outer diameter platform has projecting lugs, 7, adapted to fit or engage circumferential flanges or retaining rings on the engine case, not shown. Frequently, as a result of damage during installation or in use, lugs on such vane assembly, 2, are broken off as in FIG. 2, which illustrates a vane assembly having stubs, 8, where retaining lugs were formerly located. These stubs, 8, or damaged areas of the vane assembly, may be machined away, as shown in FIG. 3, to leave a vane assembly having a uniform repair site, 9, in the location of the failed or broken lug.

Figure 4:
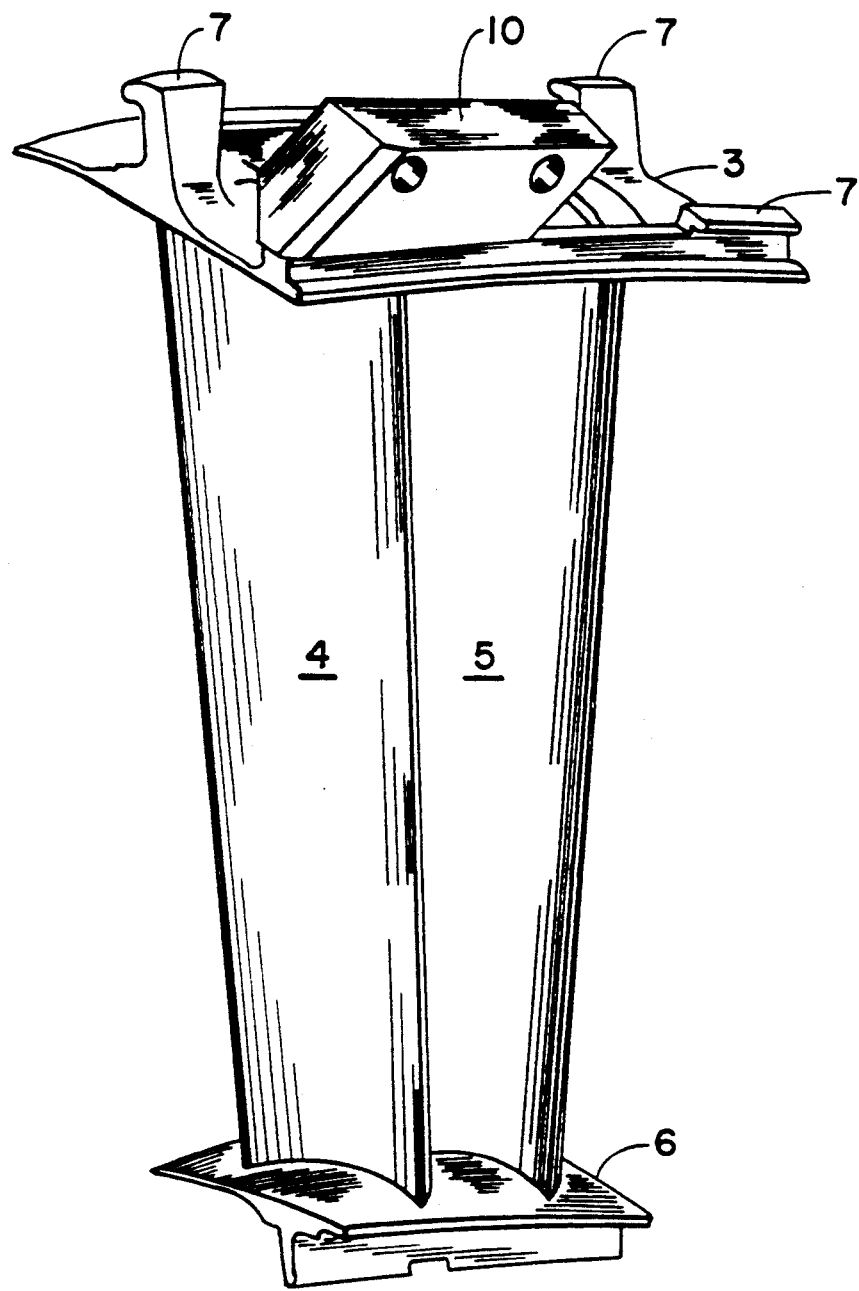
FIG. 4 illustrates a vane assembly to which a replacement lug has been bonded, prior to machining to final configuration.
Figure 8:
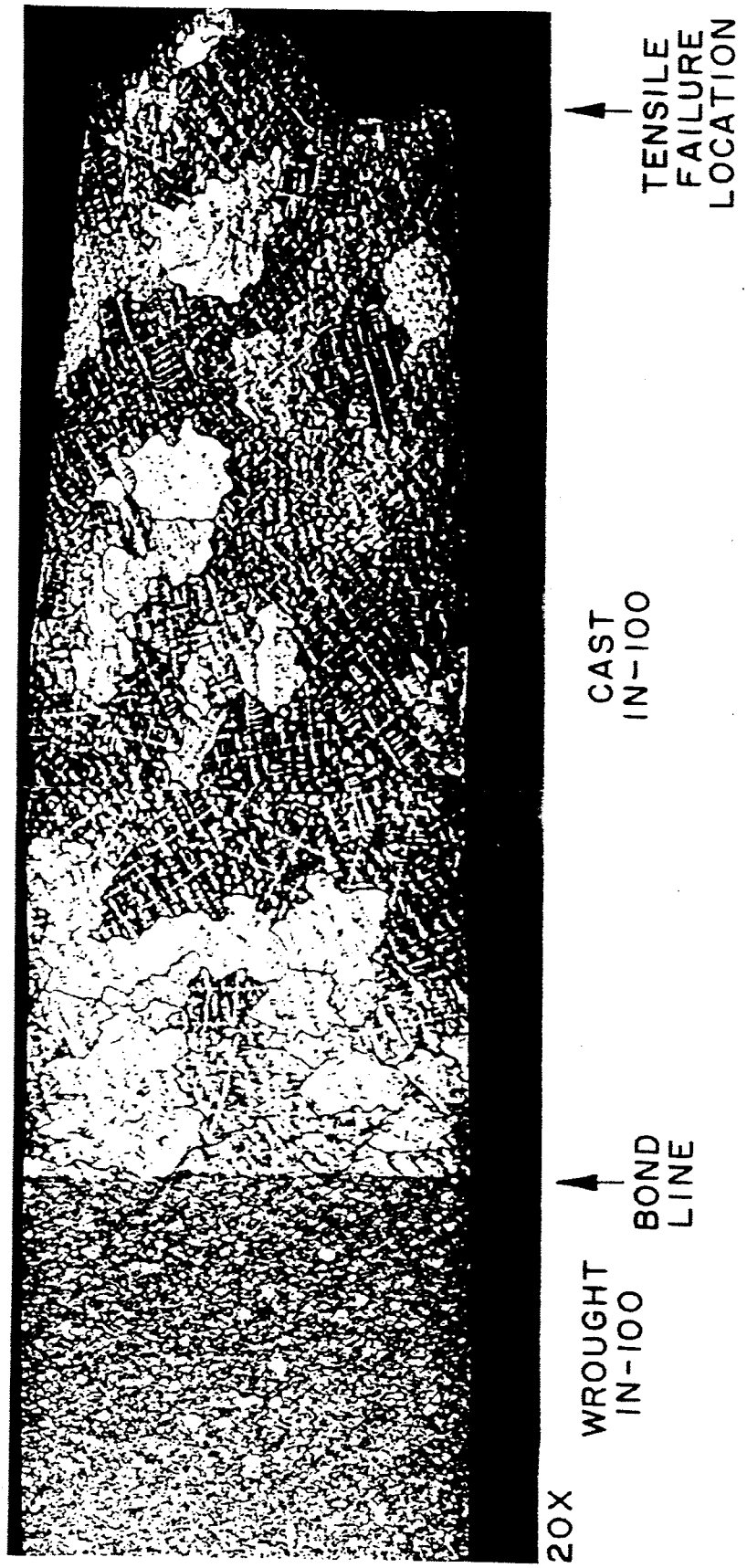
FIG. 8 is a composite photomicrograph illustrating breakage of a bonded vane and lug replacement under stress.

An oversized retaining lug blank, 10, having the requisite dimensions to replace the failed lug, is then positioned over the uniform repair site, in contact therewith, as shown in FIG. 4. This replacement lug blank is preferably of the same general composition as the cast vane assembly composition, but of a wrought alloy corresponding thereto. The replacement blank is accurately clamped in position in relation to the repair site, and is forge joined thereto by heating the interface surfaces of the blank and the repair site to a temperature within the solution temperature range of both alloys, but not exceeding the solution heat treatment temperature of either alloy, and without causing local melting or significant grain growth in the vane assembly and the replacement lug blank. The forge joined vane and replacement lug assembly, as shown in FIG. 4, is then subjected to an appropriate local or isothermal vacuum solution and age heat treatment step to achieve the desired mechanical properties, after which the replacement lug blank may be machined to the desired final configuration, as illustrated in FIG. 5, which illustrates that a lug of a differing geometry and configuration, 11, may be put in place of the failed retaining lug, if so desired. FIGS. 6 and 7 illustrate the solid state bonding of cast IN-100 with a wrought modified IN-100, in accordance with the present invention. FIG. 6 is at a magnification of 50×, while FIG. 7 is at 500×. Both samples were treated with Kallings' etchant. FIG. 8 is a composite photomicrograph, at 20× magnification, of a failed tensile specimen of bonded cast IN-100 and wrought Modified IN-100, after being stressed to the breaking point at 1425° F. It is to be noted that the locus of the break occurred not at the bond line, but at a point within the cast material, demonstrating the strength of the bond. Tensile properties for this piece, at 1425° F., were Y.S. 122.3 ksi, U.T.S. 148.9 ksi, and El. 13.3%, and RA 24.1.

As previously indicated, the present invention is specifically exemplified by the repair of damaged gas turbine engine vane assemblies, which assemblies are normally made of a cast high temperature material, such as either non-hardenable or precipitation-hardenable nickel-base superalloys, or titanium. Representative of the alloys which may be bonded by the present invention are those nickel-base or cobalt-base alloys designated in the industry as IN-100, Inconel, Hastelloy, Mar-M, Udimet, Waspaloy, Haynes, Stellite, etc. Of particular interest are single crystal cast nickel superalloys, such as are frequently used in the manufacture of turbine blades.

It has now been found that a wrought replacement blank of suitable high temperature alloy may be forge joined to a cast material assembly. The replacement blank is fashioned of a material which has been preconditioned to give it low strength and high ductility, as described in commonly owned U.S. Pat. No. 3,519,503. This reference teaches that a preferred preconditioning method consists of extruding a compacted powder billet through a die to produce a reduction in cross-sectional area of at least 4:1, and preferably at least 6:1, at a temperature below but within about 450° F. of the normal recrystallization temperature of the material. Exemplary materials include the wrought formulations of those alloys cited above as suitable. The materials suitable for use as the replacement blank in accordance with this invention are easily deformed in the solution temperature range of the cast material to which they are to be joined. The preferred alloy is that having the closest chemistry to the material of the vane assembly. Thus, if the cast assembly comprises cast IN-100, the preferred replacement blank material is wrought IN-100. An example of a suitable pairing of cast material and wrought material is the combination of IN-100 (9.5% Cr, 15.0% Co, 0.17% C, 4.75% Ti, 5.5% Al, 3.0% Mo, 0.015% B, 1.0% V, 0.06% Zr, Bal Ni) with a modified IN-100 (12.4% Cr, 18.5% Co, 0.07% C, 4.3% Ti, 5.0% Al, 3.2% Mo, 0.02% B. 0.8% V, 0.06% Zr, Bal Ni). While similar chemistry is desirable, the limiting factors appear to be avoidance of local chemical segregation, control of interfacial carbide formation, and creep and fatigue strength of the wrought material. It is considered within the skill of one familiar with cast and wrought superalloys, and/or titanium, to determine the feasibility of forge joining any specific cast/wrought material pairing, and to determine a suitable wrought material replacement blank for any given cast composition.

Preparation for a part repair includes machining away the broken area of the failed part, or in the case of a replacement, removing the part itself, to provide a uniform surface for attachment of the replacement blank. Any conventional metal removal technique is suitable, so long as a relatively smooth (20–30 microinches Ra) and uniform surface is achieved. The intended bonding surface of both the cast material assembly and the wrought replacement blank should then be treated to encourage bonding. This generally entails removal of all foreign materials, including dirt, grease, machining residue, etc., and surface oxidation. Such surface preparation may be accomplished by a variety of readily apparent techniques, such as mechanical surface grinding and cleaning, and selective chemical etching.

The replacement blank is sized to provide the desired part size and configuration after machining, and is configured so as to provide a bonding surface having a close tolerance fit to the bonding surface of the assembly. After the replacement blank is positioned in close proximity to the bonding surface of the assembly, as in a tooling fixture or jig, a forge joining pressure is applied to the blank. While this pressure is applied, the interface between the blank and the assembly bonding surface is locally heated to a temperature within about 200° F. of, but not exceeding the solution heat temperature of the material of the replacement blank, without causing local melting thereof. The tooling for this operation should avoid any scratching or loading of the assembly, and in the case of vane assemblies, must be supported only against the inside diameter of the outer platform. The replacement blank and the assembly must be maintained in true alignment during the heat-up and upset cycles, and the blank and assembly clamping systems should preferably be of copper alloy material to provide for proper water cooling and high electrical current carrying capability. The hydraulic pressure, for upset, and the electrical current, for heating, must be individually controlled to obtain a gradual, predetermined upset of the wrought material. The entire forge joining operation must be conducted in a high vacuum environment, below a pressure of $4 \times 10^{-5}$ Torr, and preferably below $10^{-5}$ Torr.

Bonding is conducted under conditions of temperature and pressure sufficient to cause metal flow. These conditions will obviously vary depending upon the exact materials involved. However, for typical superalloys the temperatures will be on the order of from about 1800° F. to 2200° F., and for titanium, on the order of 1450° to 1900° F. The pressures, for titanium, will be on the order of from about 2 to about 15 ksi, and for superalloys, from about 5 to about 40 ksi. Preferably, for titanium, temperatures of about 1500° to 1800° F., at pressures of from about 4 to 11 ksi will be employed. For the superalloys, preferred pressures will be from about 10 to 30 ksi, at temperatures of from about 1900° to 2100° F. In the bonding of typical replacement parts, it would be appropriate to have an upset or shortening of the replacement blank on the order of 0.025–0.075 inch, and preferably from 0.025–0.030 inch, during bonding to insure sufficient metal flow, and to minimize any cracking tendency of the replacement lug. Any upset material expelled from the bond area may be subsequently removed during machining to the final configuration.

EXAMPLE 1

A number of broken vane assemblies from the fourth stage of the turbine of a military jet turbine engine were prepared for repair. The vane material was IN-100 cast nickel-base superalloy, comprising 9.5% Cr, 15.0% Co, 0.17% C, 4.75% Ti, 5.5% Al, 3.0% Mo, 0.015% B, 1.0% V, 0.06% Zr, and the balance Ni. The vane retaining lug of the selected vane assemblies had broken off in service, leaving a stub as shown in FIG. 2. This stub was machined away to a smooth repair site having a uniform interface surface, which was then thoroughly cleaned in conventional manner. Wrought replacement lug blanks, machined to mate with the interface surface of each vane assembly, and having a foot section somewhat larger than the lug which had broken away, were positioned in face to face assembly with the vane interface surface. The wrought replacement lug blanks were fashioned of a modified IN-100 alloy comprising 12.4% Cr, 18.5% Co, 0.07% C, 4.3% Ti, 5.0% Al, 3.2% Mo, 0.02% B, 0.8% V, 0.06% Zr, balance Ni. The vane assemblies and replacement lug blanks were placed in a forge joining apparatus, and subjected to a forging pressure of 30 ksi under evacuation to $4 \times 10^{-5}$ Torr, while being resistance heated to a temperature of from 1910° to 1965° F. An upset of 0.030 inches was achieved before release of the forging pressure. The bonded assemblies were then isothermally heat treated, still under vacuum, at 1975°±25° F. for 8 hours, cooled at a rate equal to or faster than air cooling to room temperature, and then age heat treated at 1600°±15° F. for an additional 12 hours. The pieces were then cooled to ambient at a rate equal to or faster than air cooling. The bonds formed between the vane assemblies and the replacement lugs were inspected and found to be uniform. The replacement lug blanks were then machined to lugs of a larger base dimension than those which they replaced, as illustrated in FIGS. 1 and 5. The repaired vane assemblies were subjected to a variety of tests and found to have properties comparable or superior to those of the average vane assembly used in the military jet engine from which they were taken. When the repaired vane was subjected to tensile testing, breakage occurred in the original cast IN-100 material, rather than in the bonding zone. Photomicrographs of repaired vane assemblies show (FIGS. 6 and 7) a very strong bond line, and (FIG. 8) breakage under tension in the cast IN-100 vane. FIG. 8 is a photomicrograph of a longitudinal section of a failed tensile test specimen, tested at 1425° F. Shown are wrought IN-100, to the left of the bond line, and cast IN-100, to the right of the bond line. The tensile test failure occurred outside the bond interface zone, in the weaker cast IN-100 material. When a vane assembly has been repaired, as in this example, and is utilized in a jet engine, the enlarged lug successfully results in greater strength, and higher resistance to the working stresses which caused the original retaining lug to fail, due to increased loading surface area.

EXAMPLE 2

Elevated temperature stress-rupture testing was performed on bonded samples prepared as in Example 1. Two individual bonded samples were exposed to 1550° F./22 ksi and 1425° F./22 ksi, respectively. These temperatures and stresses are representative of the maximum typical military engine operating temperatures and stresses which the vane repair area would be exposed to in service, and are thus a measure of life. The sample tested at 1550° F./22 ksi went 93 hours before failure, and the sample tested at 1425° F./22 ksi went 543 hours, before the test was discontinued without specimen failure. These test results indicated suitable life for engine service, with the 1425° F./22 ksi temperature/stress condition being the maximum designed operating conditions. Thus, the present invention also provides the bonded repair area with the required stress-rupture capability to meet the high temperature and stress conditions encountered during typical and maximum stress and temperature in-service conditions.

It is to be understood that the above description of the present invention is subject to considerable modification, change, and adaptation by those skilled in the art, and that such modifications, changes, and adaptations are to be considered to be within the scope of the present invention, which is set forth by the appended claims.

We claim:

1. A method for joining a cast alloy selected from the group consisting of nickel-base superalloys, cobalt-base superalloys, and titanium alloys, to a wrought alloy selected from the same group, without the use of additional materials, said method consisting of:
   a) machining the surfaces of the cast alloy and the wrought alloy to provide smooth faces;
   b) positioning the smooth face of said cast alloy adjacent to and in direct contact with the smooth face of said wrought alloy, and drawing a vacuum around the thus formed interface;
   c) applying a bonding force thereto;
   d) locally heating said interface to a temperature which causes softening, metal flow, and bonding of said cast alloy and said wrought alloy; and
   e) removing said bonding force and subjecting the bonded assembly to a heat treatment so as to optimize the properties thereof.

2. A method as set forth in claim 1, wherein said cast alloy is a nickel-base superalloy.

3. A method as set forth in claim 2, wherein said cast alloy is a single crystal alloy.

4. A method as set forth in claim 3, wherein said wrought alloy is a nickel-base superalloy.

5. A method as set forth in claim 4, wherein said cast nickel-base superalloy is IN-100 and said wrought nickel-base superalloy is a modified IN-100 alloy.

6. A method as set forth in claim 1, wherein said interface is heated to a temperature of from about 1900° F. to about 2100° F., and said bonding force is from about 10 to about 30 ksi.

7. A method as set forth in claim 1, wherein said wrought alloy is fabricated in such a manner that said alloy becomes deformable under conditions of elevated pressure and temperature.

8. A method as set forth in claim 1, wherein said cast alloy and said wrought alloy are of different compositional families.

9. A method for replacing a portion of an assembly wherein said assembly comprises a cast nickel-base or cobalt-base superalloy and the replacement comprises a wrought nickel-base or cobalt-base superalloy, wherein said wrought replacement is solid state bonded directly to said cast assembly without the use of additional materials, said method including the steps of:
   a) fabricating a replacement blank of said wrought superalloy in such a manner that said blank becomes deformable under conditions of elevated pressure and temperature, including forming a replacement blank bonding surface thereupon;

b) removing a portion of the original cast assembly in such a fashion as to form a repair site including an assembly bonding surface;

c) positioning said wrought superalloy replacement blank bonding surface accurately in direct mating contact with said cast superalloy assembly bonding surface, and disposing said blank and said assembly within forging means;

d) evacuating said forging means while locally heating said replacement blank bonding surface and said assembly bonding surface, and simultaneously applying pressure to said replacement blank to obtain deformation thereof at the interface of said wrought superalloy blank bonding surface and said cast superalloy assembly bonding surface, and a solid state bonding of said wrought superalloy and said cast superalloy at said interface to thereby form an integral assembly;

e) vacuum heat treating said integral assembly; and f) machining said integral assembly so as to obtain the desired assembly configuration.

10. A method as set forth in claim 9, wherein said cast alloy is a single crystal nickel-base superalloy.

11. A method as set forth in claim 10, wherein said replacement blank is a wrought nickel-base superalloy.

12. A method as set forth in claim 11, wherein said cast nickel-base superalloy is IN-100 and said wrought nickel-base superalloy is a modified IN-100 alloy.

13. A method as set forth in claim 12, wherein said interface is heated to a temperature of from about 1900° F. to about 2100° F., and said bonding force is from about 10 to about 30 ksi.

14. A method as set forth in claim 13, wherein said solid state bonding at said interface does not result in the recrystallization of said cast single crystal alloy.

15. A method for replacement of a retaining lug on a vane assembly, said vane assembly comprising a cast alloy selected from the group consisting of nickel-base superalloys, cobalt-base superalloys, and titanium alloys, said method consisting of:

a) removing a pre-existing lug from said cast alloy vane assembly, leaving a stub portion of said pre-existing lug, machining said stub portion to provide a face which constitutes a smooth surface to which a replacement lug may be bonded;

b) positioning a replacement lug blank in direct contact with the face of said stub, said replacement lug blank being of a wrought alloy selected so as to be readily forge joined to said cast alloy of said vane, and drawing a vacuum around said face and said blank;

c) applying a bonding force to said replacement lug blank and said face of said stub;

d) locally heating the interface between said replacement lug blank and said face to a temperature which causes softening, metal flow, and bonding of said lug blank to said face;

e) removing said force and subjecting the bonded vane assembly and replacement lug blank to a heat treatment so as to optimize properties of the bonded assembly;

f) removing said bonded assembly, and machining the replacement lug blank to the desired final configuration.

16. A method as set forth in claim 15, wherein said cast alloy is a single crystal nickel-base superalloy.

17. A method as set forth in claim 16, wherein said replacement lug blank comprises a wrought nickel-base superalloy.

18. A method as set forth in claim 17, wherein said cast nickel-base superalloy is IN-100 and said wrought nickel-base superalloy is a modified IN-100 alloy.

19. A method as set forth in claim 18, wherein said interface between said blank and said face is heated to a temperature of from about 1900° F. to about 2100° F., and said bonding force is from about 10 to about 30 ksi.

20. A method for replacing a vane assembly retaining lug wherein said vane assembly comprises a cast nickel-base or cobalt-base superalloy and the replacement retaining lug comprises a wrought superalloy, wherein said replacement retaining lug is solid state bonded directly to said vane assembly without the use of additional materials, said method consisting of:

a) fabricating a replacement lug blank of said wrought superalloy in such a manner that said blank becomes deformable under conditions of elevated pressure and temperature, including forming a replacement lug blank bonding surface thereupon;

b) removing the original vane assembly retaining lug from said vane assembly in such a fashion as to form a repair site including a vane assembly bonding surface;

c) positioning said replacement lug blank bonding surface accurately in direct mating contact with said vane assembly bonding surface, and disposing said blank and said vane assembly within forging means;

d) evacuating said forging means while locally heating said replacement lug blank bonding surface and said vane assembly bonding surface, and simultaneously applying pressure to said replacement lug blank to obtain deformation thereof at the interface of said blank bonding surface and said vane assembly bonding surface and a solid state bonding at said interface to form an integral assembly;

e) vacuum heat treating said integral assembly without recrystallizing said cast superalloy; and f) machining said integral assembly so as to obtain the desired vane assembly retaining lug configuration.

21. A method as set forth in claim 20, wherein said cast superalloy is a single crystal nickel-base superalloy.

22. A method as set forth in claim 21, wherein said replacement lug blank comprises a wrought nickel-base superalloy.

23. A method as set forth in claim 22, wherein said cast nickel-base superalloy is IN-100 and said wrought nickel-base superalloy is a modified IN-100 alloy.

24. A method as set forth in claim 23, wherein said interface between said blank and said face is heated to a temperature of from about 1900° F. to about 2100° F., and said bonding force is from about 10 to about 30 ksi.

25. A method for joining a cast alloy turbine blade, said cast alloy selected from the group consisting of nickel-base superalloys, cobalt-base superalloys, and titanium alloys, directly and without the use of additional materials, to a wrought alloy turbine disk, said wrought alloy selected from the group consisting of nickel-base superalloys, cobalt-base superalloys, and titanium alloys, said method consisting of:

a) machining the mating surfaces of said blade and said disk so as to provide smooth surfaces thereupon;

b) positioning the smooth faces of said cast alloy blade and said wrought alloy disk in direct mating relationship, and drawing a vacuum around the interface formed thereby;

c) applying a bonding force thereto, while heating said interface to a temperature sufficient to cause softening, metal flow, and bonding of said cast alloy and said wrought alloy; and d) removing said bonding force, and subjecting the bonded blade and disk assembly to a heat treatment so as to optimize the properties thereof.

26. A method as set forth in claim 25, wherein said blade is a nickel-base single crystal alloy.

27. A method as set forth in claim 26, wherein said wrought alloy is a nickel-base superalloy.

28. A method as set forth in claim 25, wherein said wrought alloy disk is fabricated in such a manner that such alloy becomes deformable under conditions of elevated pressure and temperature.

29. A method as set forth in claim 25, wherein steps a, b, and c are repeated for sufficient multiples blades to form an integrally bladed rotor.

* * * * *